United States Patent Office 3,305,366
Patented Feb. 21, 1967

3,305,366
COLOR AND FERMENTATION STABILIZATION OF FRESH FRUITS
William J. Sutton and Robert M. Lauck, Park Forest, Ill., assignors to Stauffer Chemical Company, New York, N.Y., a corporation of Delaware
No Drawing. Filed Mar. 25, 1963, Ser. No. 267,828
12 Claims. (Cl. 99—154)

This invention relates to edible fruit compositions which resists color changes and fermentation upon storage, and the process of producing the same. In a preferred aspect, it relates to edible apple, banana, and pear compositions comprising a stabilizing mixture of a prophoric acid and sodium bisulfite or sodium sulfite.

Various newly peeled fruits, e.g., apples, bananas, and pears, will quickly darken at their cut surfaces upon standing in air and usually undergo fermentation upon prolonged storage. The darkening effect, initially observed as a brown or black surface discoloration, is thought to be largely enzymatic, involving an interaction between oxygen and polyphenoloxidases. Non-enzymatic darkening may also accompany the more pronounced enzymatic reactions. Further, upon prolonged storage of the fruits, their sugars may ferment to liberate carbon dioxide and from various organic acids (the latter indicated by a fall in pH). These changes in the stored fruit are undesirable since they result in a shorter shelf life, spoilage, and consumer rejection. Enzymatic spoilage has been known to be delayed somewhat by certain chemical treatments and by blanching. However, none of these treatments are entirely satisfactory. For example, some of the known color-stabilizing chemicals will produce a prohibitive taste, at the levels required, in the stored fruit. Blanching, which usually imparts an undesirable stewed or cooked flavor to the product, is generally less effective than chemical stabilization.

We have now discovered that enzymatic darkening and fermentation of fresh fruits may be effectively inhibited, without imparting an objectionable flavor, by inclusion therein of a synergistic mixture consisting of a phosphoric acid and at least one sulfur compound selected from the group consisting of sodium sulfite and sodium bisulfite. The phosphoric acid which may be used will have an analysis between 68.8% and 86.3% by weight of $P_2O_5$ (based on the undiluted acid). However, a preferred phosphoric acid is pyrophosphoric acid having approximately 78.0% $P_2O_5$.

By our process, the synergistic mixture is added to the raw fruit (after peeling, trimming, slicing, etc.) either as a dilute cover solution or as a dry mixture. This latter procedure is perhaps preferable when preparing a puree, such as banana puree and the like. In applications where a sliced or diced fruit is to be canned and stored for long periods, a cover solution is prehaps preferable. In any event, the stabilizing componuds are added directly or from a dilute aqueous solution, as contrasted with other types of treaments, e.g., surface treament. Where solutions of the active compounds are used, no advantage is seen in either heating or cooling the solution prior to application, although solution temperatures above and below room temperature are intended to be within the scope of the process described herein. After addition of the active compounds, the fruit may be packaged, canned, refrigerated, or frozen as best meets the needs of contemplated use and consumer preference.

Although precise control is not necessary, the relative amount of phosphoric acid and sulfur compounds added to the fruit is important if maximum stabilization is to be effected. Accordingly, the over-all weight ratio of phosphoric acid (basis: undiluted acid) to sulfur compound is preferably between 4:1 and 1:2. With the preferred pyrophosphoric acid additive, where the sulfur compound is sodium bisulfite, a weight ratio of the former to the latter of approximately 2:1 furnishes optimum stabilization. Notwithstanding the criticality of the ratio for maximum synergism, mixtures in all ratios furnish a higher degree of stabilization than the individual compounds.

The total amount of stabilizing compounds added to the fruit must be controlled. Amounts higher than those set forth hereinbelow produce undesirable properties in the final product, e.g., poor flavor, etc., while lower amounts will yield ineffective stabilization. The maximum amount of total additives (not including any water used in preparing cover solutions) will be approximately 1.0% by weight of the fruit. The minimum amount of total additives consonant with a high degree of stability is approximately 0.01% by weight of the final fruit. Within this range, applies and, to a lesser extent bananas, require a lower total additive content for maximum effectiveness. A preferred composition will comprise, by weight, between 0.05% and 0.4% of the additive mixture.

The following specific examples will serve to illustrate the invention. Unless otherwise indicated, all percentages and parts shown are by weight.

Example 1

Ripe bananas were peeled, mashed, stirred well with a metal spoon, and a small amount of the resulting puree was rapidly placed in screw-cap glass jars (2 in. dia., 2.5 in. high). Using a 50 ml. pipette, cover solutions comprising various candidate stabilizing compounds and mixtures thereof were added (above the puree) to the jars. The bananas, so treated, were stored at room temperature (25° C.) and were periodically examined to observe color changes and fermentation characteristics. The results of these tests are presented in the following table:

TABLE I.—TREATMENTS [1] OF BANANA PUREES TO PREVENT DARKENING [2] AND FERMENTATION

| Cover Solution Used | Storage Life [3] (Days at 25° C.) | Observations [3] |
| --- | --- | --- |
| Deionized water | 1 | Browning on surface (1 cm. thick). |
| 0.10% ascorbic acid | 4 | No brown color by 4 days, but gas production. |
| 0.10% ascorbic acid + 0.20% pyrophosphoric acid | 4 | No brown color by 4 days, but gas production. |
| 0.10% sodium bisulfite | 11 | No brown color by 11 days, but gas production. |
| 0.10% sodium bisulfite + 0.20% citric acid | 13 | No brown color by 13 days, but gas production. |
| 0.10% sodium bisulfite + 0.20% citric acid | 20 | No brown color by 20 days, but gas production. |
| 0.20% pyrophosphoric acid + 0.10% sodium bisulfite + 0.20% pyrophosphoric acid | 33+ | Original condition after 33 days. |

[1] One standard tablespoon of banana puree was mixed well with 50 ml. of deionized water (or solution).
[2] 0.20% citric acid, or 0.20% pyrophosphoric acid used alone has little effect—products brown after one day.
[3] Storage life stated in days at 25° C. until fermentation was apparent in the product.

Example 2

Banana purees and cover solutions were prepared in accordance with the procedures set forth in Example 1. These purees with various cover solutions were placed in storage and examined visually from time to time. Also, each puree was tested using catechol solution after standing at least one day at about 25° C. (room temperature.). The puree was stirred and filtered and then 0.10 ml. of filtered extract was added to 10 ml. of a 1.0% catechol solution in de-ionized water in a glass vial. Oxidation with a resultant discoloration of the catechol was measured at 400 m$\mu$ in a 19 x 105 ml. cuvette at 0.5 minute intervals for a period of five minutes at about 25° C. For this measurement a Spectronic-20 instrument was used. The reaction rate in O.D. (optical density) units per minute was taken over a one minute to three minute reaction time. The results of these tests are presented in the following table:

From the data of Table III, supra, it may be observed that at higher proportions of sodium bisulfite and pyrophosphoric acid, i.e., above about 1.2% by weight of the puree, a pungent sulfur odor may be detected. The sulfur odor is thought to be caused by the liberation of $SO_2$ at lower pH values of the puree.

*Example 4*

Four, 100 gram portions of banana puree were prepared in accordance with the procedure described in Ex- TABLE II.—EFFECT OF PYROPHOSPHORIC AICD AND SODIUM BISULFITE ON DARKENING AND FERMENTATION IN BANANA PUREES

| Cover Solution Used [1] | Storage Life (Days at 25° C.) | Oxidase [2] Enzyme Activity, m$\mu$ | Observations |
|---|---|---|---|
| De-ionized water | 1 | 0.320 | Brown after 1 day. |
| 0.20% pyrophosphoric acid | 1 | 0.160 | Do. |
| 0.50% pyrophosphoric acid | 2 | 0.030 | Brown after 2 days. |
| 1.00% pyrophosphoric acid | 3 | 0.000 | Brown after 3 days. |
| 0.002% sodium bisulfite | 1 | 0.320 | Brown after 1 day. |
| 0.005% sodium bisulfite | 1 | 0.245 | Do. |
| 0.010% sodium bisulfite | 2 | 0.220 | Brown after 2 days. |
| 0.020% sodium bisulfite | 3 | 0.190 | Brown after 3 days. |
| 0.050% sodium bisulfite | 3 | 0.010 | Do. |
| 0.100% sodium bisulfite | 14 | 0.001 | At 14 days—gas production, and blue mold forms. No brown color. |
| 0.002% sodium bisulfite +0.20% pyrophosphoric acid each | 1 | 0.190 | Brown after 1 day. |
| 0.005% sodium bisulfite +0.20% pyrophosphoric acid each | 2 | 0.065 | Brown after 2 days. |
| 0.010% sodium bisulfite +0.20% pyrophosphoric acid each | 2 | 0.040 | Do. |
| 0.020% sodium bisulfite +0.20% pyrophosphoric acid each | 7 | 0.004 | Brown after 7 days. |
| 0.050% sodium bisulfite +0.20% pyrophosphoric acid each | 21 | 0.010 | Fermentation at 21 days—no brown color or fermentation up to 21 days. |
| 0.100% sodium bisulfite +0.20% pyrophosphoric acid each | 21 | 0.001 | |

[1] Using one tablespoon of banana puree and 50 ml. of cover solution.
[2] 0.1 ml. filtered banana extract and 10 ml. 1.0% catechol solution. Enzyme activity measurements made on banana puree filtrate on day browning occurred or at later times when fermentation occurred.

From Table II it may be observed that pyrophosphoric acid, when used alone, is relatively ineffective for stabilizing the color of banana puree. Even at a 1% level of pyrophosphoric acid, the puree will brown after only three days. On the other hand, pyrophosphoric acid is highly effective in decreasing the polyphenoloxidase activity of the product. Sodium bisulfite may be seen to be somewhat effective for inhibiting browning although considerably less effective than sodium bisulfite-pyrophosphoric acid mixtures. Significantly, when used alone, 0.2% pyrophosphoric acid or 0.1% sodium bisulfite will stabilize banana puree for one day and fourteen days, respectively, while a mixture of 0.2% pyrophosphoric acid and 0.1% sodium bisulfite (Table II) will permit storage of the puree for at least twenty-one days without adverse effect.

*Example 3*

Five individual samples of banana puree were prepared in accordance with the procedure described in Example 1. Various mixtures of solid sodium bisulfite and pyrophosphoric acid were added to four of the samples with mixing. The fifth sample was used as a control. The five samples were then placed in storage at 25° C. and observed periodically. The results of this test are set forth in the following table:

ample 1. To each of these samples was added a mixture of pyrophosphoric acid or sodium acid pyrophosphate and sodium bisulfite, with vigorous stirring. Dry, solid compounds were added and no cover solution was used. So treated, the purees were placed in glass jars and stored at 25° C. until significant changes were observed. The results observed during storage are presented in the following table:

TABLE IV.—TREATMENT OF BANANA PUREE WITH PYROPHOSPHORIC ACID OR SODIUM ACID PYROPHOSPHATE AND SODIUM BISULFITE

| Treatment [1] | pH | Observations at 25° C.[2] |
|---|---|---|
| 0.20% $H_4P_2O_7$+0.10% $NaHSO_3$ | 4.26 | Original condition (color, odor) at 6 days. |
| 0.20% $H_4P_2O_7$+0.05% $NaHSO_3$ | 4.30 | Surface browning after 24 hours. |
| 0.20% $Na_2H_2P_2O_7$+0.10% $NaHSO_3$ | 4.87 | Brown surface discoloration at 6 days. |
| 0.20% $Na_2H_2P_2O_7$+0.05% $NaHSO_3$ | 4.81 | Surface browning after 24 hours. |

[1] Solid chemicals thoroughly mixed into 100 gram portions of banana puree. Sodium bisulfite was added to the mashed banana, stirred, and then pyrophosphoric acid (or sodium acid pyrophosphate) was added and again well stirred into the mashed banana.
[2] Treated banana puree was stored in screw-cap glass jars at about 25° C. Only 0.20% $H_4P_2O_7$+0.10% $NaHSO_3$ completely inhibited surface mold growth.

TABLE III.—TREATMENT [1] OF BANANA PUREES WITH PYROPHOSPHORIC ACID AND SODIUM BISULFITE

| Additives Used | pH—Puree after days at 25° C. | | | | Observations |
|---|---|---|---|---|---|
| | 1 | 4 | 7 | 12 | |
| None | 4.70 | 4.62 | 3.91 | 3.72 | Darkened rapidly—had fermented by 5 days, dark brown by 1 day. |
| 0.1 g. sodium bisulfite 0.20 g. pyrophosphoric acid | 3.80 | 3.85 | 3.82 | 3.82 | pH after 21 days—3.79. No brown color for 30 days. No strong sulfur odor—maintained banana odor. No fermentation or mold growth. |
| 0.15 g. sodium bisulfite 0.30 g. pyrophosphoric acid | 3.41 | 3.44 | 3.42 | 3.40 | Had extensive mold growth after 6 days |
| 0.20 g. sodium bisulfite 0.40 g. pyrophosphoric acid | 3.08 | 3.13 | 3.12 | 3.15 | Maintained original color at least for 12 days. Had pungent sulfur odor. |
| 0.25 g. sodium bisulfite 0.50 g. pyrophosphoric acid | 2.84 | 2.96 | 2.90 | 2.99 | Maintained original color at least for 12 days. Had pungent sulfur odor. |

[1] Used 50 g. portions of banana puree—added 5 g. sucrose to each plus solid chemicals.

Example 5

A group of Jonathan apples were peeled, sliced and placed in small (approx. 50 ml.) glass vials. To each glass vial was then added a cover solution consisting of distilled water in which was dissolved a minor amount of sodium bisulfite, or sodium bisulfite and pyrophosphoric acid. As a control, distilled water containing no additives was used as a cover solution in one vial. After being sealed, the vials were placed in boiling water for fifteen minutes and then cooled to room temperature. Upon reaching room temperature, each vial was examined visually to ascertain the color of the apples. The color was judged on a scale of from 0, for pure white, to 10, for dark brown. Without breaking the seals, the vials were then placed in an oven maintained at 50° C. to accelerate degradation. At five days after canning, the vials were removed from the oven and the color of the apples was evaluated in accordance with the above-mentioned color scale. The results are set forth in the following table:

TABLE V.—EFFECT ON BROWNING OF APPLES CANNED IN SODIUM BISULFITE OR PYROPHOSPHORIC AND SODIUM BISULFITE SOLUTIONS

|  | Canned Apple Color [1] (50° C. Storage) | |
|---|---|---|
|  | 0 days | 5 days |
| No additive (control) | 8 | 10 |
| 0.026% sodium bisulfite | 2 | 6 |
| 0.026% sodium bisulfite / 0.052% pyrophosphoric acid | 0 | 3 |
| 0.012% sodium bisulfite | 4 | 8 |
| 0.012% sodium bisulfite / 0.024% pyrophosphoric acid | 3 | 6 |
| 0.006% sodium bisulfite | 6 | 10 |
| 0.006% sodium bisulfite / 0.012% pyrophosphoric acid | 0 | 6 |

[1] 0=white; 2=trace brown; 4=very slightly brown; 6=slight brown; 8=moderate brown; and 10=dark brown (intermediate intensities assigned odd numbers).

Example 6

Newly peeled pears were mashed and placed in small screw-top glass jars. Solutions of the candidate stabilizing compounds were added to the pears and thoroughly mixed in with a spoon. The tops were loosely placed on the jars. Various test samples and a control were prepared in this manner and stored at about room temperature for three months. At the end of three months the pears were observed. These observations are set forth in the following table:

TABLE VI.—TREATMENT [1,2] OF PEAR PUREE WITH PYROPHOSPHORIC ACID AND SODIUM BISULFITE

| Additive Used | Storage Three Months at 75°–80° F. | |
|---|---|---|
|  | Color | pH |
| None | Very dark brown—mold growth | 3.8 |
| 0.05% sodium bisulfite | Dark brown—mold growth | 3.8 |
| 0.10% sodium bisulfite | Light brown—no mold growth | 3.7 |
| 0.05% sodium bisulfite / 0.10% pyrophosphoric acid | Light brown—mold growth | 3.4 |
| 0.10% sodium bisulfite / 0.20% pyrophosphoric acid | Original pear color—no off odor—no mold growth | 3.1 |

[1] Used 50 g. portions of pear puree—added 5 ml. solution of compounds and mixed intimately.
[2] Stored treated product in 4 oz. glass jars with screw-on caps.

Although perhaps less effective than with bananas, apples, and pears, the synergistic mixtures of the invention may be used to ameliorate the color and/or fermentation characteristics of various other fresh, uncooked fruits and vegetables, and, in particular, potatoes, tomatoes, various red berry products, and peaches. Essentially any fresh fruit or vegetable which undergoes enzymatic darkening or which contains fermentable sugars is a likely candidate for stabilization by the method of the invention. In some cases, however, the fermentation and/or discoloration problems will not be sufficiently grave to warrant stabilization, or the particular problems may be solvable by another, completely satisfactory method already known to the art.

In addition to pyrophosphoric acid, the acids generally referred to in the art as orthophosphoric, superphosphoric, and polyphosphoric are suitable for preparing the stabilized compositions of the invention. For example, orthophosphoric acid, N.F., comprising 62.7% $P_2O_5$ (diluted) as well as polyphosphoric acid, technical grade, having an orthophosphoric acid equivalent of 115.0% and a $P_2O_5$ content of 83.0%, furnish a satisfactory degree of stabilization. Food grade acid is preferable, although impurities are normally insignificant at the levels of additives employed by the invention. Further, various acidic and basic alkali metal and alkaline earth metal phosphates, metaphosphates and polyphosphates may be used to supplement and/or modify the activity of the phosphoric acid and sulfur compound. For example, a cover solution containing 0.1% sodium acid pyrophosphate, 0.1% pyrophosphoric acid, and 0.1% sodium bisulfite furnishes a high degree of color stabilization with a banana puree. When used alone or together with the sulfur compound, however, the phosphates normally do not prevent surface mold growth, e.g., see Table IV, supra. Consequently, for the preferred compositions of the invention, phosphoric acid, at least in some small amount, is a necessary component of the stabilizing mixtures.

The details given hereinabove are for the purpose of illustration, and variations within the spirit of the invention are intended to be included within the following appended claims.

We claim:

1. A method of treating raw, peeled, cut, sliced, or pureed bananas, apples and pears which comprise adding to the raw bananas, apples and pears a mixture of pyrophosphoric acid and a compound selected from the group consisting of sodium bisulfite and sodium sulfite, in an amount between 0.01% and 1.0% by weight of the raw bananas, apples and pears, the over-all weight ratio of pyrophosphoric acid to sulfur compound being between 4:1 and 1:2.

2. A method of treating raw, peeled, cut, sliced, or pureed bananas, apples and pears which comprises adding to the raw bananas, apples and pears an aqueous cover solution comprising a mixture of pyrophosphoric acid and a compound selected from the group consisting of sodium bisulfite and sodium sulfite, the mixture being present in an amount between 0.05 and 0.4% by weight of the raw bananas, apples and pears, the over-all weight ratio of pyrophosphoric acid to sulfur compound being between 4:1 and 1:2.

3. The method of treating raw, peeled, cut, sliced or pureed bananas to stabilize the color and fermentation characteristics thereof which comprises adding to the raw bananas a mixture of pyrophosphoric acid and sodium bisulfite in an amount between 0.01% and 1.0% by weight of the bananas, the over-all weight ratio of pyrophosphoric acid to sodium bisulfite being approximately 2:1.

4. The method of treating raw, peeled, cut, sliced or pureed apples to stabilize the color and fermentation characteristics thereof which comprises adding to the raw apples a mixture of pyrophosphoric acid and sodium bisulfite in an amount between 0.01% and 1.0% by weight of the apples, the over-all weight ratio of pyrophosphoric acid to sodium bisulfite being approximately 2:1.

5. The method of treating raw, peeled, cut, sliced or pureed pears to stabilize the color and fermentation characteristics thereof which comprises adding to the raw pears a mixture of pyrophosphoric acid and sodium bisulfite in an amount between 0.01% and 1.0% by weight of the pears, the over-all weight ratio of pyrophosphoric acid to sodium bisulfite being approximately 2:1.

6. An improved raw, peeled, cut, sliced, or pureed bananas, apples and pears comprising from 0.01% to 1.0% by weight of a mixture of pyrophosphoric acid and a compound selected from the group consisting of sodium bisulfite and sodium sulfite, the over-all weight ratio of pyrophosphoric acid to sulfur compound being between 4:1 and 1:2.

7. An improved raw, peeled, cut, sliced, or pureed banana product comprising between 0.01 and 1.0% by weight of said banana of a mixture of pyrophosphoric acid and a compound selected from the group consisting of sodium bisulfite and sodium sulfite, the over-all weight ratio of pyrophosphoric acid to sulfur compound being between 4:1 and 1:2.

8. A product according to claim 7 wherein the mixture consists of pyrophosphoric acid and sodium bisulfite.

9. An improved raw, peeled, cut, sliced or pureed apple product comprising between 0.01 and 1.0% by weight of said apple of a mixture of pyrophosphoric acid and a compound selected from the group consisting of sodium bisulfite and sodium sulfite, the over-all weight ratio of pyrophosphoric acid to sulfur compound being between 4:1 and 1:2.

10. A product according to claim 9 wherein the mixture consists of pyrophosphoric acid and sodium bisulfite.

11. An improved raw, peeled, cut, sliced or pureed pear product comprising between 0.01 and 1.0% by weight of said pear of a mixture of pyrophosphoric acid and a compound selected from the group consisting of sodium bisulfite and sodium sulfite, the over-all weight ratio of pyrophosphoric acid to sulfur compound being between 4:1 and 1:2.

12. A product according to claim 11 wherein the mixture consists of pyrophosphoric acid and sodium bisulfite.

References Cited by the Examiner
UNITED STATES PATENTS

| | | | |
|---|---|---|---|
| 2,506,793 | 5/1950 | Kalmar et al. | 99—154 |
| 2,860,055 | 11/1958 | Jansen | 99—154 |

A. LOUIS MONACELL, *Primary Examiner.*

RAYMOND N. JONES, *Examiner.*

R. AULL, *Assistant Examiner.*